United States Patent [19]
Rodulfo

[11] Patent Number: 5,886,882
[45] Date of Patent: Mar. 23, 1999

[54] PUSH-PULL DC-DC CONVERTER WITH TRANSFORMER HAVING MULTIPLE PRIMARY AND SECONDARY WINDINGS WITH DIODES CONNECTED BETWEEN THEM WITH MOSFET SWITCHING

[75] Inventor: Philip Rodulfo, Norwich, Great Britain

[73] Assignee: Advanced Power Conversion Ltd., Farnborough, England

[21] Appl. No.: 23,795

[22] Filed: Feb. 13, 1998

Related U.S. Application Data

[62] Division of Ser. No. 661,456, Jun. 11, 1996, Pat. No. 5,777,858.

[51] Int. Cl.⁶ .................................................. H02M 3/335
[52] U.S. Cl. ................................. 363/24; 363/26; 363/16; 363/41
[58] Field of Search .................................. 363/24, 25, 16, 363/26, 41, 45, 133, 134, 97

[56] References Cited

U.S. PATENT DOCUMENTS

| | | | |
|---|---|---|---|
| 4,184,197 | 1/1980 | Cuk et al. | 363/16 |
| 4,250,541 | 2/1981 | Chang et al. | 363/28 |
| 4,257,087 | 3/1981 | Cuk | 363/16 |
| 4,706,181 | 11/1987 | Mercer | 363/133 |
| 4,961,128 | 10/1990 | Bloom | 363/16 |
| 5,777,858 | 7/1998 | Rodulfo | 363/24 |

Primary Examiner—Shawn Riley

[57] ABSTRACT

A converter has an assembly with a transformer primary and secondary windings and two pairs of primary and secondary choke windings wound around a core. Switching circuits are coupled between the transformer primary winding and the two primary choke windings. Each switching circuit has a capacitor, diode and a MOSFET. The MOSFETs are switched on and off in a cyclical manner to provide a continuous output current from a continuous input current by operating in a push-pull manner.

7 Claims, 5 Drawing Sheets

PUSH-PULL DC-DC CONVERTER WITH TRANSFORMER HAVING MULTIPLE PRIMARY AND SECONDARY WINDINGS WITH DIODES CONNECTED BETWEEN THEM WITH MOSFET SWITCHING

CROSS REFERENCE TO RELATED APPLICATIONS

This application is a division of Ser. No. 08/661,456 filed 11 Jun. 1996, now U.S. Pat. No. 5,777,858.

FIELD OF THE INVENTION

The present invention relates to a converter, typically for a power supply for supplying a continuous output current, from a continuous input current, with particular applications, including power supplies for automotive or telecom applications.

BACKGROUND OF THE INVENTION

Transformers used in electrical and electronic applications for "transforming" an input voltage to a higher or lower voltage (and often referred to as "Boost" and "Buck" converters respectively) are well known to persons skilled in the art. A problem with known transformers is to provide assemblies which operate with both continuous input and output currents. This is possible with a series of boost and buck converters, but a simple cascade of two such converters requires a substantial number of components and, additionally, requires complex circuitry to drive the devices. A known DC—DC converter which operate with continuous input and output currents is described in U.S. Pat. No. 4,184,197 (CUK et al) and is commonly referred to as a CUK converter. The CUK converter is a single ended converter which has a capacitor in series with the output to provide the continuous output current when the switching device is on. This capacitor is subjected to high ripple currents and is a critical and expensive component.

SUMMARY OF THE INVENTION

The converter of the present invention is operable to provide a continuous output current from a continuous input current and has a transformer assembly comprising a transformer section and a choke. The transformer assembly comprises a core assembly, and primary and secondary winding circuits. The primary circuit includes a primary transformer winding, and first and second primary choke windings. The secondary circuit has a secondary transformer winding and first and second secondary choke windings electromagnetically coupled to the respective primary windings. All of the windings are provided on the core assembly. The primary circuit also comprises a first switching circuit coupled between the first primary choke winding and the primary transformer winding, and a second switching circuit coupled between the primary transformer winding and the second primary choke winding. The first and second switching circuits are operable in a push-pull operation throughout a switching cycle so that the flux flow in the transformer assembly is such that the voltage induced in the secondary windings provides a continuous output voltage and current from the secondary windings throughout the switching cycle. This has the advantage of providing a converter in which a continuous output current is provided for a continuous input current without the need for an increased number of components or for a series coupled output capacitor which is subject to the high ripple current discussed above. It allows twice the flux excursion, and, hence improved utilization of the core assembly. No snubbering components are required on the primary switches which increases the efficiency of the converter. The low number of components also has the added advantage of reduced manufacturing cost.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
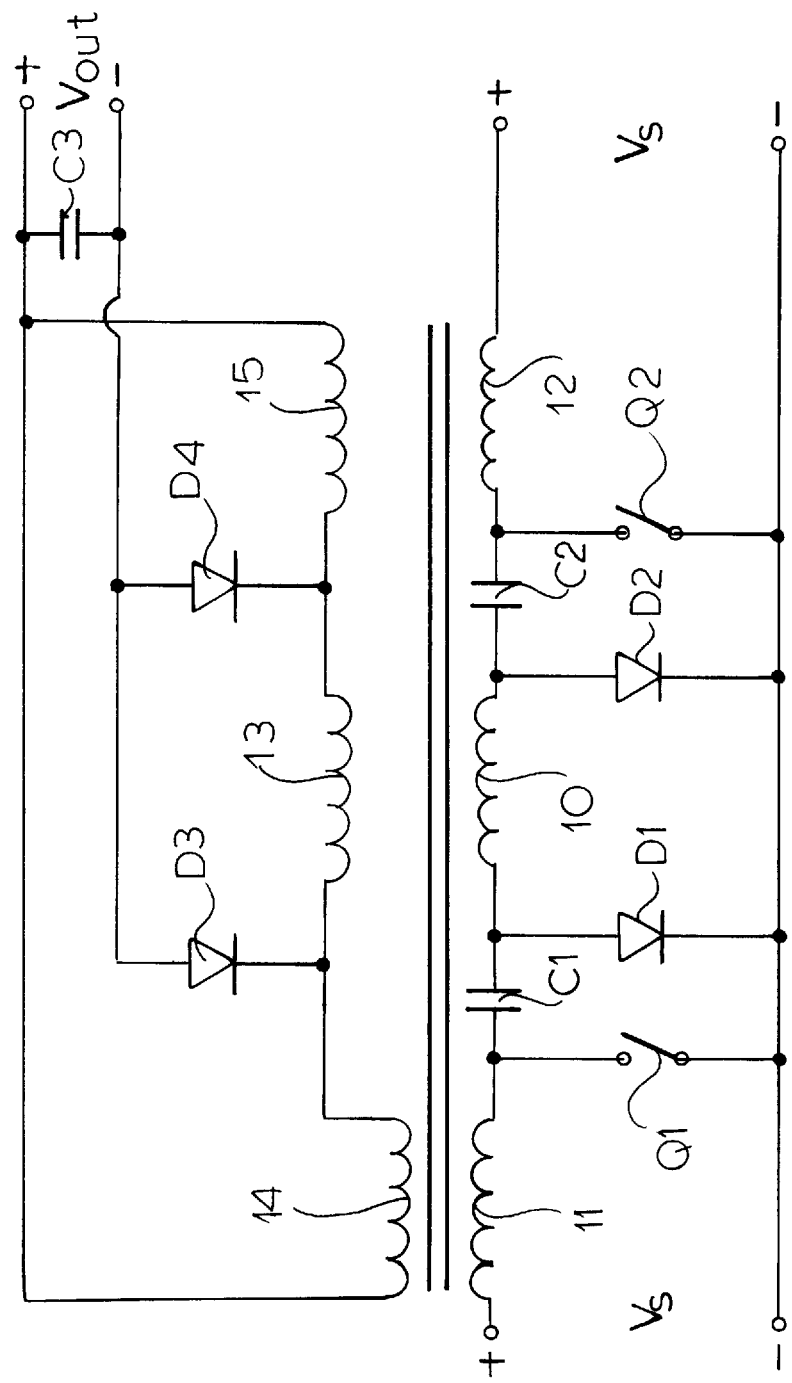
FIG. 1 is a schematic circuit diagram of a transformer assembly according to the present invention.
Figure 2:
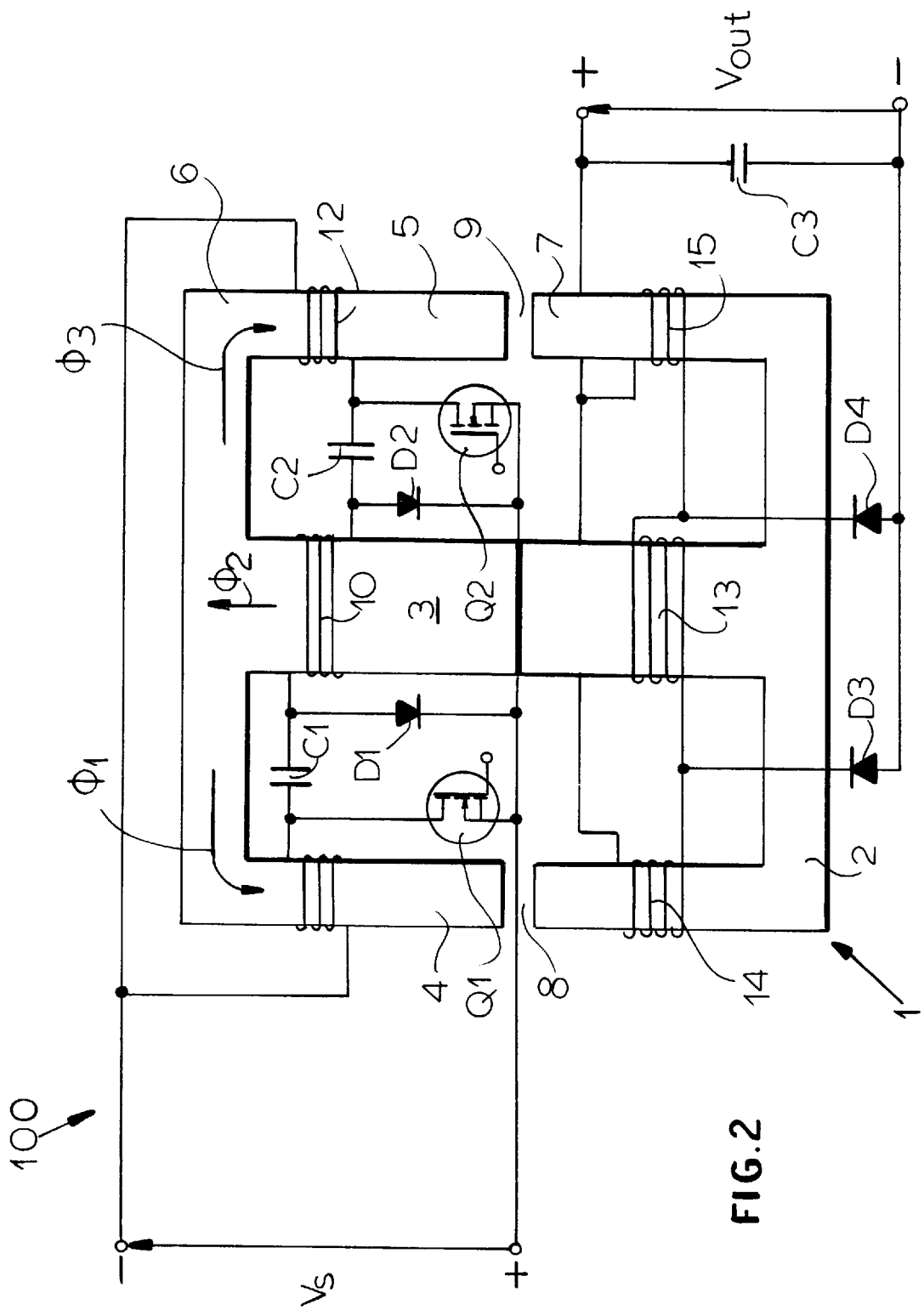
FIG. 2 is a schematic representation of the transformer assembly of FIG. 1 during a first part of the operating cycle, and illustrating the magnetic flux path.

The converter shown in FIG. 2 comprises a transformer assembly having a ferrite core. The ferrite core comprises two E-shaped core pieces 6, 7 to provide a core assembly having a central transformer limb 3, and two outer choke limbs 4, 5 (see also FIGS. 3 and 4). Air gaps 8, 9 are provided in the outer limbs 4, 5 to form the choke. As is well known to persons skilled in the art, the gaps 8,9 are provided to store energy, thereby acting as the choke. Primary and secondary transformer and choke windings 10, 11, 12, 13, 14, 15 are provided on the respective center and outer limbs 3, 4, 5. The windings 10-15 are also visible in FIG. 1.

In the drawing, the plus (+) and minus (−) terminals have been designated to show polarity.

The provision of chokes in transformers are, in themselves, well known to persons skilled in the art.

Figure 3:
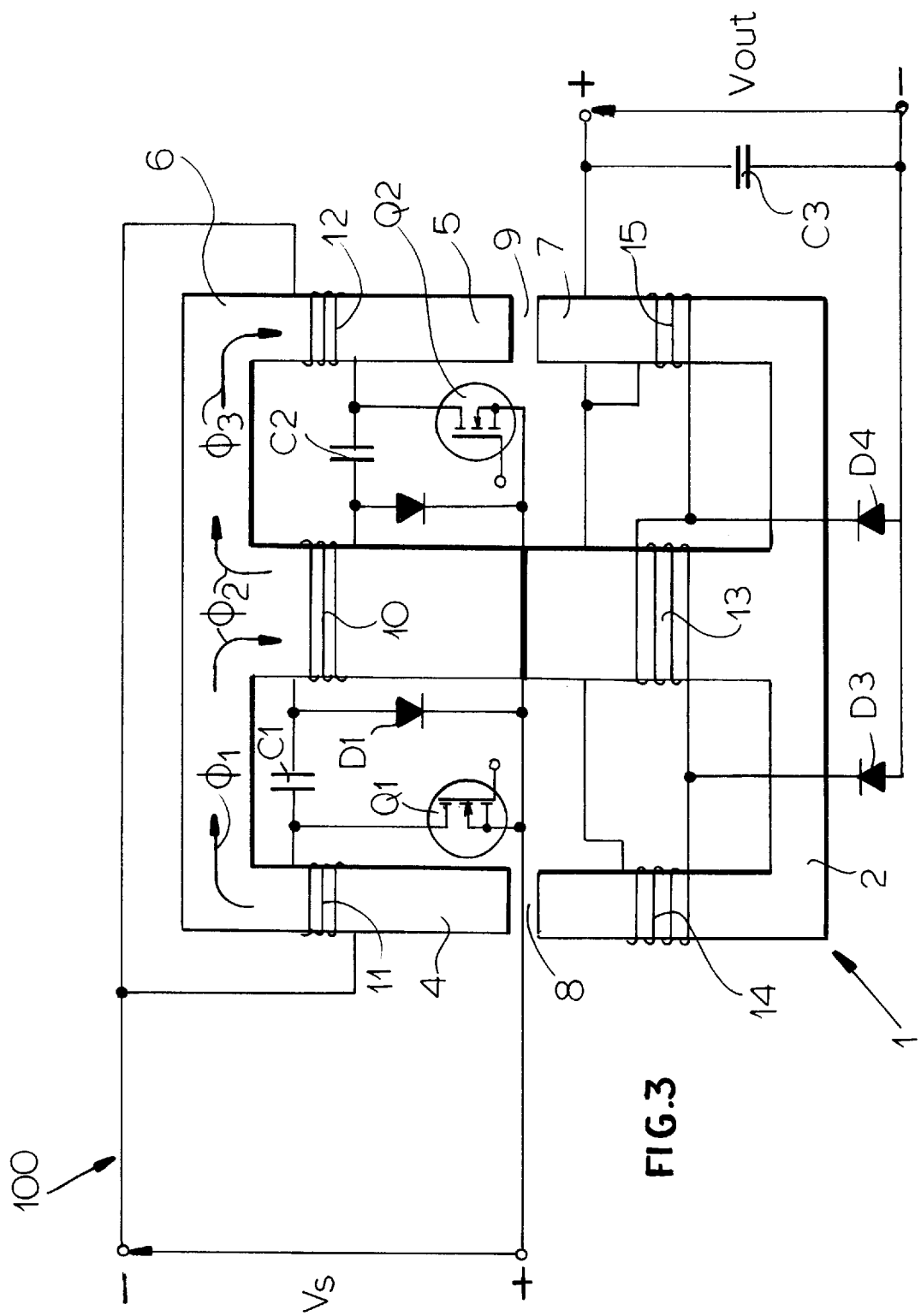
FIG. 3 is a schematic representation of the transformer assembly of FIG. 1 during a second and fourth part of the operating cycle, and illustrating the magnetic flux path.
Figure 4:
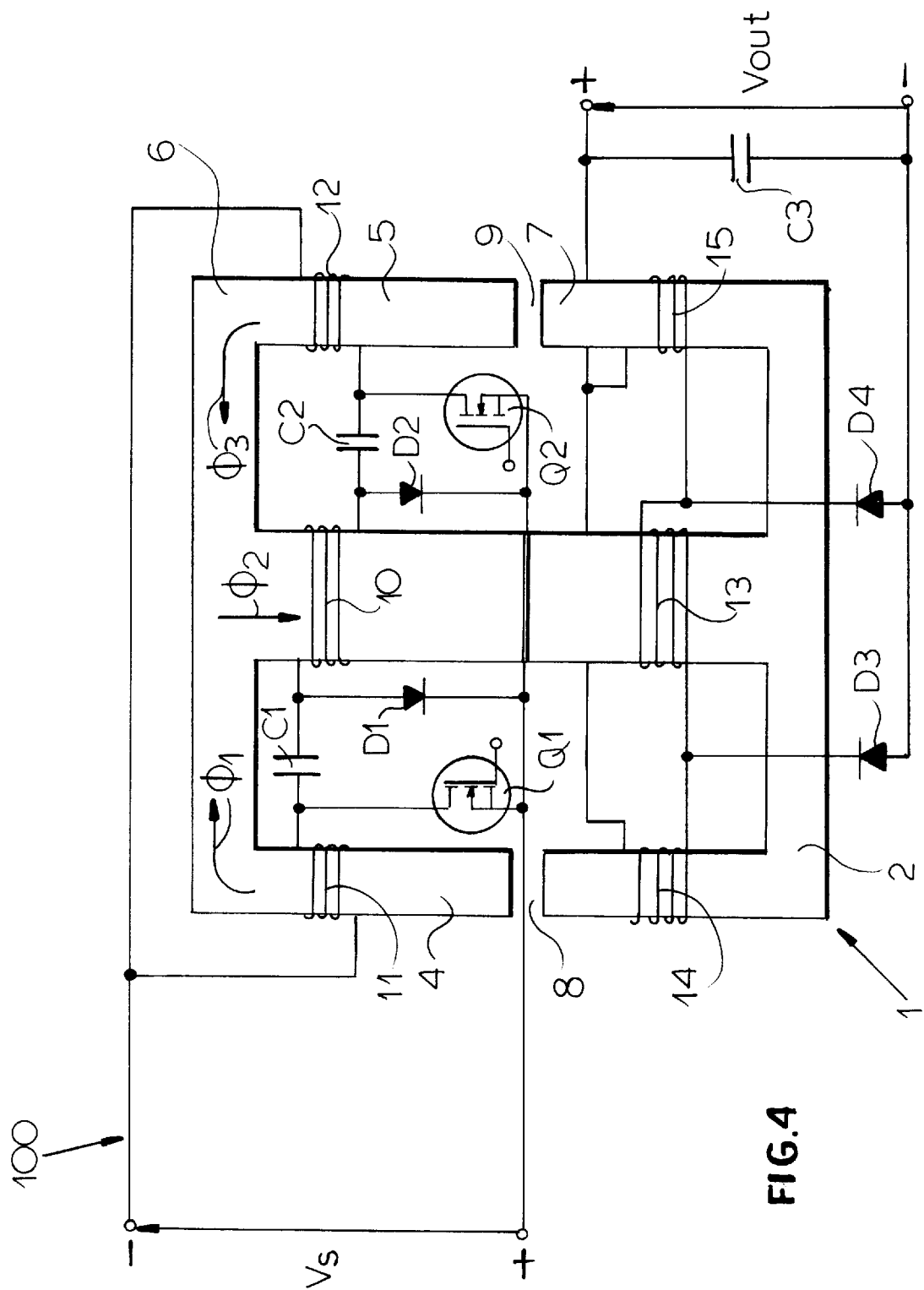
FIG. 4 is a schematic representation of the transformer assembly of FIG. 1 during a part of the operating cycle, and also illustrating the magnetic flux path.

The primary transformer winding 10 is wound around the center limb 3, and is coupled in series to two primary choke windings 11, 12 wound around respective outer limbs 4, 5 as illustrated in FIGS. 2 to 4. Similarly, respective secondary transformer and choke windings 13, 14, 15 are wound around the center limb 3 and two outer limbs 4, 5 so as to be electromagnetically coupled to the respective primary windings 10, 11, 12.

Primary capacitors C1 and C2 are series coupled between the first primary choke winding 11 and the primary transformer winding 10, and between the primary transformer winding 10 and the second primary choke winding 12, respectively. Two primary switches Q1 and Q2 are provided in the primary circuit coupled between the transformer winding 10 and the respective choke windings 11, 12. The switches Q1 and Q2 are MOSFETs, which are operable in a conventional manner as is well known to persons skilled in the art. Two primary circuit diodes D1 and D2 are also provided in parallel to the two switches Q1 and Q2 (see also FIG. 1).

An input voltage $V_s$, is coupled to the primary circuit comprising the primary windings 10, 11, 12.

The input voltage $V_s$, and the output voltage $V_{out}$ are coupled to and from the transporter assembly 1 in a known manner.

In the secondary circuit, two secondary circuit diodes D3 and D4 are provided coupled between the secondary transformer winding 13 and the respective secondary choke windings 14, 15 and a secondary circuit capacitor C3 is coupled across the output. All this is illustrated in FIGS. 1 to 4. The secondary capacitor C3 is provided for smoothing.

In use, an input voltage, $V_s$, is supplied to the primary circuit across the primary windings, and the power switches Q1 and Q2 are cyclically switched on and off so that in one period Q1 is "on" and Q2 is "off", then, in the second period, both Q1 and Q2 are "off", then, in the third period, Q1 is still "off" while Q2 is "on", and then finally, in the fourth period, both Q1 and Q2 are "off" again - and so on. The switches Q1 and Q2 are, as said before, conventional MOSFETs pulse modulated to suit the operation.

Generally, for a Boost - Buck converter, the transfer ratio is given by:

$$V_{out} = (V_{in}/n) \cdot (D/(1-D))$$

where n is the ratio of primary turns, n1, to secondary turns, n2;

$V_{out}$ is the output voltage;

$V_{in}$ is the input voltage and equal to $V_s$ (FIG. 1 to FIG. 2); and where D is the duty cycle, that is the ratio of the "on" period of the power switch of the transformer, $T_{on}$, to the total period of the cycle, $T = T_{on} + T_{off}$, so:

$$D = T_{on}/T$$

Therefore, the transfer ratio becomes:

$$\begin{aligned} V_{out} &= (V_{in}/n) \cdot (T_{on}/T_{off}) \\ &= (V_{in} \cdot x)/n \end{aligned}$$

where $x = T_{on}/T_{off}$

In the embodiment described herein, all the primary windings 10, 11, 12 have the same number of turns, n2.

Transformer windings and cores are, in themselves, well known to persons skilled in the art, and need not be described in any further detail herein, except as is relevant to the present invention. In the embodiment described herein, the transformer core and the windings are made of known materials and constructed in a known manner, for example, the core is made of ferrite.

The turns ratio is selected depending upon the input voltage and the required output voltage as with known transformers.

The "on" and "off" periods for the switches Q1 and Q2 will be the same, and the duty cycle, D, is modulated using conventional pulse modulation techniques by control means (not shown) coupled to the switches Q1, Q2 to ensure that the output voltage is kept constant.

Let us consider the first period when MOSFET Q1 is on, and MOSFET Q2 is off. During this period, in the primary section of the transformer assembly 1, the capacitor C1 is discharging through the primary winding 10, diode D1 is reversed biased and diode D2 is forward biased. The left-hand side limb 4 i.e. of the choke (as viewed in FIGS. 2 to 4) will be storing flux.

The magnetic flux flowing through the transformer assembly 1 is given as follows:

$$\Phi_2 = \Phi_1 + \Phi_3$$

where $\Phi_1$, $\Phi_2$ and $\Phi_3$ are the flux in the left-hand limb 4, center limb 3 and right-hand limb 5 of the transformer core respectively.

The flow of the flux is illustrated in FIGS. 2 to 4 by the arrows.

For an input voltage $V_{in} = V_s$, the voltage across the primary choke winding 11 on the left-hand limb 4 will be $V_s$, and, therefore, using Faraday's Law:

$$\Phi_1 \alpha V_s/n1$$

where n1 is the number of primary turns.

Assuming a charge on C1 of $V_s(1+x)$ from the previous switching cycle - the derivation of which is given below with respect to the second part of the switching cycle in which both MOSFETs are off, then, because C1 is discharging through the primary winding 10, then the voltage across this primary winding 10 will be $V_s(1+x)$, and, therefore, again from Faraday's Law:

$$\Phi_2 \alpha V_s(1+x)/n1$$

We can see, therefore, that the flux $\Phi_3$ flowing through the right-hand limb 5 is:

$$\alpha V_s(1+x)/n1 - V_2/n1$$

$$\alpha V_s x/n1$$

Now, in the secondary section of the transformer, the diode D3 is reverse biased, and diode D4 is forward biased, and the output voltage $V_{out}$ is derived from the summation of the secondary voltages in the left-hand limb 4 and the center limb 3, and directly from the right-hand limb 5.

Now, the voltage across the right-hand secondary choke winding 15 is $$= n2 \cdot \Phi_3$$

$$= (n2/n1)V_s x$$

The voltage across the left-hand secondary choke winding 14 is $$= n2 \cdot \Phi_1$$

$$= (n2/n1) \cdot V_s$$

The voltage of the secondary transformer winding 13 is $$= n2 \cdot \Phi_2$$

$$= (n2/n1) \cdot V_s(1+x)$$

Therefore, $$\begin{aligned} V_{out} &= (n2/n1)2 \cdot V_s(1+x) - (n2/n1) \cdot V_s \\ &= (n2/n1) \cdot V_s \cdot x \end{aligned}$$

Now let us consider the second period in which MOSFET Q1 is off and MOSFET Q2 is also off. In this period, the diodes D1 and D2 are forward biased and conducting, and the flux is solely confined to the two outer limbs 4,5 i.e. to the choke, with zero net flux flowing in the center transformer limb 3. In the secondary section, the two diodes D3 and D4 are also forward biased and conducting, thereby clamping the voltage across the secondary transformer winding 13 at zero volts.

Now, under stable operating conditions, the volts per second area over a complete switching cycle must equate to zero, and, therefore, $V_s T_{on} = V_{choke} T_{off}$ where $V_{choke}$ is the voltage across a choke winding.

Therefore, in the primary section of the transformer assembly, the voltage across the left-hand choke winding 11, $$V_{left\ choke} = V_s \cdot T_s \cdot T_{on}/T_{off}$$
$$= V_s \cdot x$$

In this part of the switching cycle, the two diodes D1 and D2 are forward biased and conducting, therefore the two primary capacitors C1 and C2 are being charged to a value $V_s + V_{left\ choke} = V_s 32 V_s \cdot x$, which is equal to $V_s(1+x)$ as we stated above.

Now, $\Phi_2$ is zero, and, therefore, $$\Phi_1 = \Phi_3$$

Again, from Faraday's Law:

$$\Phi_1 \alpha V_{left\ choke}/n1$$

$$\alpha V_s x/n1$$

and, therefore $$\Phi_3 \alpha V_s x/n1$$

In this period, the output voltage $V_{out}$ is derived from the secondary voltages across the two secondary choke windings 13, 14, i.e. it is therefore proportional to the flux $\Phi_1$ and $\Phi_2$ through those windings and, therefore, $$V_{out} \alpha \Phi_1 \alpha \Phi_2$$

Therefore, $$V_{out} = (n2/n1) \cdot V_s x$$

In the next period, MOSFET Q1 is off and MOSFET Q2 is on. This is similar to the period when Q1 is on and Q2 is off with the exception that the phasing of the right-hand primary winding 5 is selected to cause a flux reversal in the center transformer limb 3, so that:

$$V_{out} = (n2/n1) \cdot V_s x$$

And, finally, in the next period, both the MOSFETs Q1 and Q2 are off again, which is identical to the earlier period described above, and the output is supplied from the outside choke limbs.

As we can see, this converter operates in a "push-pull" manner to provide a continuous output current generated from a continuous input current during the complete operating cycle.

Figure 5:
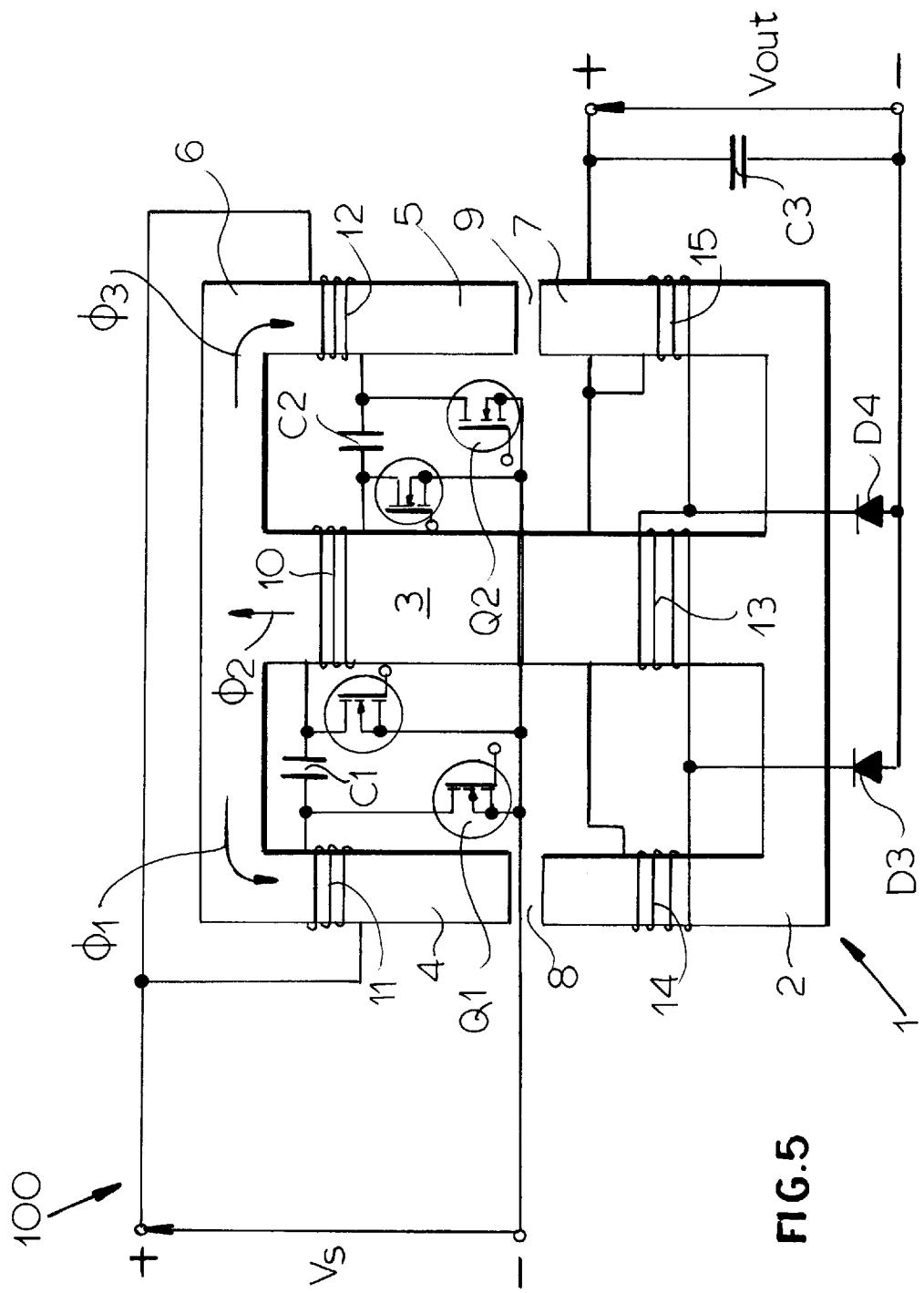
FIG. 5 is a view of an embodiment similar to that of FIG. 2 using MOSFETs.

As will be obvious to a person skilled in the art, various modifications are possible within the scope of the present invention. For example different core configurations may be used, for example an E-shaped or I-shaped core piece could be used. Other switching devices could be used rather than MOSFETs, and the secondary diodes could be replaced by MOSFETs. FIG. 5 shows an embodiment which is identical to that of FIG. 2 but wherein, for example, the diodes D1 and D2 of the FIG. 2 embodiment have been replaced by MOSFETs. Multiple additional windings could be provided, and the primary winding could be used with the appropriate circuitry.

I claim:

1. A converter for converting an input voltage to an output voltage, the converter comprising:

voltage input means receiving an input voltage;

voltage output means for outputting an output voltage;

a transformer assembly comprising a primary section and a secondary section, the primary section being coupled to the voltage input means for receiving the input voltage therefrom, and the secondary section being coupled to the voltage output means for producing the output voltage, the primary section comprising first and second choke windings, having reverse phasings, and a transformer winding, and the secondary section comprising first and second choke windings and a transformer winding, and means for inductively coupling the respective windings of the primary and secondary sections to each other;

the primary section further comprising a first charge storage means series coupled between the first primary choke winding and the primary transformer winding, a second charge storage means series coupled between the secondary primary choke winding and the primary transformer winding, a first switch means coupled across the voltage input means and to the first primary choke winding and first storage means, a second switch means coupled across the voltage input means and to the second primary choke winding and second charge storage means, a first diode means coupled in parallel with the first switch means and a second diode means coupled in parallel with the second switch means;

the secondary section further comprising third diode means coupled across the current output means and to the first secondary winding and the secondary transformer winding and fourth diode means coupled across the current output means and to the second secondary winding and the secondary transformer winding;

said means for inductively coupling comprising a core assembly, the primary and secondary windings being wound on said core assembly;

the first and second switch means being operable in a continuous four phase cycle in which the switch means are cyclically switched on and off such that, in a first phase of the cycle, for a predetermined period, the first switch means is on, and the second switch means is off, in the second and fourth phases of the cycle, both switches are off, and in the third phase, the first switch is off and the second switch is on, whereby, with the input voltage coupled to the converter, throughout all the phases of the cycle, flux flow through the primary section induces current flow in the windings of the secondary section such the output voltage is continuous, the first and second switch means being MOSFETs.

2. The converter defined in claim 1 wherein the output voltage is proportional to a ratio of on and off periods of the cycle.

3. The converter defined in claim 2 wherein the ratio is continuously variable and selectable to provide the continuous output voltage.

4. The converter defined in claim 3 wherein the ratio is varied by pulse modulation of the first and second switching means.

5. The converter defined in claim 1 wherein the secondary section further comprises a third charge storage means coupled across the voltage output means.

6. The converter defined in claim 1 wherein the core assembly comprises a center limb and first and second outer limbs, the primary and secondary transformer windings being provided on the center limb and the first primary and secondary choke windings on the first outer limb and the second primary choke windings on the second outer limb.

7. The converter defined in claim 1 wherein the first and second outer limbs are each provided with an air gap.

* * * * *